(12) United States Patent
Dehghani et al.

(10) Patent No.: US 11,860,969 B2
(45) Date of Patent: Jan. 2, 2024

(54) UNIVERSAL TRANSFORMERS (71) Applicant: Google LLC, Mountain View, CA (US)

(72) Inventors: Mostafa Dehghani, Amsterdam (NL); Stephan Gouws, London (GB); Oriol Vinyals, London (GB); Jakob D. Uszkoreit, Portola Valley, CA (US); Lukasz Mieczyslaw Kaiser, Mountain View, CA (US)

(73) Assignee: Google LLC, Mountain View, CA (US)

( * ) Notice: Subject to any disclaimer, the term of this patent is extended or adjusted under 35 U.S.C. 154(b) by 724 days.

(21) Appl. No.: 16/989,455

(22) Filed: Aug. 10, 2020

(65) Prior Publication Data

US 2021/0056162 A1 Feb. 25, 2021

Related U.S. Application Data

(63) Continuation of application No. 16/417,587, filed on May 20, 2019, now Pat. No. 10,740,433.

(60) Provisional application No. 62/673,831, filed on May 18, 2018.

(51) Int. Cl.
*G06N 3/04* (2023.01)
*G06F 17/14* (2006.01)

(52) U.S. Cl.
CPC .............. *G06F 17/14* (2013.01); *G06N 3/04* (2013.01)

(58) Field of Classification Search
CPC ...... G06N 3/04; G06N 3/0464; G06N 3/0475; G06N 3/0495; G06N 3/0499; G06F 17/14
See application file for complete search history.

(56) References Cited

U.S. PATENT DOCUMENTS

| | | |
|---|---|---|
| 2017/0140753 A1 | 5/2017 | Jaitly et al. |
| 2018/0060727 A1 | 3/2018 | Rainwater |
| 2018/0144208 A1 | 5/2018 | Lu et al. |
| 2019/0130249 A1* | 5/2019 | Bradbury ............... G06N 3/084 |
| 2019/0130273 A1* | 5/2019 | Keskar ................... G06N 3/044 |
| 2019/0354567 A1* | 11/2019 | Dehghani .............. G06N 3/044 |
| 2020/0034435 A1 | 1/2020 | Norouzi et al. |

FOREIGN PATENT DOCUMENTS

WO WO 2018/058046 3/2018

OTHER PUBLICATIONS

EP Office Action in European Appln. No. 19728839.2, dated Aug. 18, 2022, 12 pages.
Ahmed et al., "Weighted Transformer Network for Machine Translation", arXiv, Nov. 6, 2017, 10 pages.
Ba et al., "Layer Normalization", arXiv, Jul. 21, 2016, 14 pages.
Bahdanau et al., "Neural Machine Translation by Jointly Learning to Align and Translate", arXiv, May 19, 2016, 15 pages.
Cho et al., "Learning Phrase Representatives using RNN Encoder-Decoder for Statistical Machine Translation", arXiv, Sep. 3, 2014, 15 pages.

(Continued)

*Primary Examiner* — Paulinho E Smith
(74) *Attorney, Agent, or Firm* — Fish & Richardson P.C.

(57) ABSTRACT

Methods, systems, and apparatus, including computer programs encoded on computer storage media, for implementing a sequence to sequence model that is recurrent in depth while employing self-attention to combine information from different parts of sequences.

20 Claims, 5 Drawing Sheets

(56) References Cited

OTHER PUBLICATIONS

Chollet "Xception: Deep Learning with Depthwise Separable Convolutions", arXiv, Apr. 4, 2017, 8 pages.
Chu et al., "Broad Context Language Modeling as Reading Comprehension", arXiv, Feb. 16, 2017, 6 pages.
Dehghani et al. "Universal Transformers," arXiv1807.03819v3, Mar. 5, 2019, 23 pages.
Dhingra et al., "Linguistic Knowledge as Memory for Recurrent Neural Networks", arXiv, Mar. 7, 2017, 10 pages.
Dhingra et al., "Neural Models for Reasoning over Multiple Mentions using Conference", arXiv, Apr. 16, 2018, 7 pages.
Fojo et al. "Comparing Fixed and Adaptive Computation Time for Recurrent Neural Networks," arXiv 1803.08165, Mar. 21, 2018, 8 pages.
Freivalds et al. "Improving the Neural GPU Architecture for Algorithm Learning," arXiv1702.08727v2, Jul. 4, 2018, 10 pages.
Gehring et al., "Convolutional Sequence to Sequence Learning", arXiv, Jul. 25, 2017, 15 pages.
Graves "Adaptive Computation Time for Recurrent Neural Networks", arXiv, Feb. 21, 2017, 19 pages.
Graves "Generating Sequences with Recurrent Neural Networks", arXiv, Jun. 5, 2014, 43 pages.
Graves et al., "Improving Neural Language Models with Continuous Cache", arXiv, Dec. 13, 2016, 9 pages.
Graves et al., "Neural Turing Machines", arXiv, Dec. 10, 2014, 26 pages.
Gulcehre et al., "Hyperbolic Attention Networks", arXiv, May 24, 2018, 15 pages.
Henaff et al., "Tracking the World State with Recurrent Entity Networks", arXiv, May 10, 2017, 15 pages.
Hochreiter et al., "Gradient Flow in Recurrent Nets: the Difficulty of Learning Long-Term Dependencies", A Field Guide to Dynamical Recurrent Neural Networks, 2003, 15 pages.
Joulin et al., "Inferring Algorithmic Patterns with Stack-Augmented Recurrent Nets", Advances in Neural Information Processing Systems, 2015, 9 pages.
Kaiser et al., "Depthwise Separable Convolutions for Neural Machine Translation", arXiv, Jun. 16, 2017, 10 pages.
Kaiser et al., "Neural GPUs Learn Alggorithms", International Conference on Learning Representations (ICLR), arXiv, Mar. 15, 2016, 9 pages.
Kumar et al., "Ask me anything: Dynamic Memory Networks for Natural Language Processing", International Conference on Machine Learning, 2016, pp. 1378-1387, 10 pages.
Lin et al., "A Structured Self Attentive Sentence Embedding", aeXiv, Mar. 9, 2017, 15 pages.
Linzen et al., "Assessing the Ability of LSTMs to Learn Syntax-Sensitive Dependencies", arXiv, Nov. 4, 2016, 15 pages.
Paperno et al., "The LAMBADA Dataset: Word Prediction Requiring a Broad Discourse Context", Proceedings of the 54th Annual Meeting of the Association for Computational Linguistics (vol. 1: Long Papers), 2016, 1:1525-1534, 10 pages.
Parikh et al., "A Decomposable Attention Model for Natural Language Inference", Empirical Methods in Natural Language Processing, 2016, 7 pages.
PCT International Search Report and Written Opinion issued in International Application No. PCT/US2019/033156, dated Aug. 23, 2019, 20 pages.
Rae et al., "Scaling Memory-Augmented Neural Networks with Sprse Reads and Writes", Advances in Neural Information Processing Systems, 2016, pp. 3621-3629, 9 pages.
Seo et al., "Query-Reduction Networks for Question Answering", arXiv, Feb. 24, 2017, 13 pages.
Srivastava et al., "Dropout: A Simple Way to Prevent Neural Networks from Overfitting", Journal of Machine Learning Research, 2014, 15(1):1929-1958, 30 pages.
Sukhbaatar et al., "End-to-End Memory Networks", Advances in Neural Information Processing Systems 28, 2015, pp. 2440-2448, 8 pages.
Sutskever et al., "Sequence to Sequence Learning with Neural Networks", Advances in Neural Information Processing Systems, 2014, pp. 3104-3112, 9 pages.
Tran et al., "The Importance of Being Recurrent for Modeling Hierarchical Structure", Proceedings of NAACL, 2018, 6 pages.
Vaswani et al., "Tensor2Tensor for Neural Machine Translation", arXiv, Mar. 16, 2018, 9 pages.
Weston et al., "Towards AI-Complete Question Answering: A set of Prerequisite Toy Tasks", arXiv, Dec. 31, 2015, 14 pages.
Yang et al. "Lie-Access Neural Turing Machines," arXiv 1611.02854v1 Nov. 9, 2016, 12 pages.
Yogatama et al., "Memory Architectures in Recurrent Neural Network Language Models", International Conference on Learning Representations, 2018, 10 pages.
Zaremba et al., "Learning to Execute", arXiv, Feb. 19, 2015, 25 pages.
Zhao et al. "Paragraph-level Neural Question Generation with Maxout Pointer and Gated Self-attention Networks", Oct. 2018, p. 3901-3910. (Year: 2018).
PCT International Preliminary Report on Patentability in International Application No. PCT/US2019/033156, dated Nov. 24, 2020, 12 pages.
Office Action in European Appln. No. 19728839.2, dated Oct. 2, 2023, 11 pages.

* cited by examiner

UNIVERSAL TRANSFORMERS

CROSS-REFERENCE TO RELATED APPLICATIONS

This application is a continuation of U.S. application Ser. No. 16/417,587, filed on May 20, 2019, which claims priority to U.S. Provisional Application No. 62/673,831, filed on May 18, 2018. The disclosures of the prior applications are considered part of and are incorporated by reference in the disclosure of this application.

BACKGROUND

Self-attentive feed-forward sequence models such as the Transformer have been shown to achieve impressive results on sequence modeling tasks including machine translation, image generation and constituency parsing, presenting a compelling alternative to recurrent neural networks, the de facto standard architecture for many sequence modeling problems. Despite these successes, however, the Transformer fails to generalize in some tasks recurrent models handle with ease. This includes copying strings or simple logical inference when the string or formula lengths exceed those observed at training time.

The Transformer model is described in Vaswani et al., Attention Is All You Need, 31st Conference on Neural Information Processing Systems (NIPS 2017), Long Beach, CA, USA, available at https://papers.nips.cc/paper/7181-attention-is-all-you-need.pdf. This paper is incorporated here by reference.

SUMMARY

This specification describes systems that implement a Universal Transformer. Universal Transformers address, among others, the shortcomings described in the Background, above. Instead of the common sequence-aligned recurrence, the Universal Transformer is recurrent in depth, while employing self-attention to combine information from different parts of sequences.

The Universal Transformer combines the desirable parallelizability of self-attentive feed-forward models with an inductive bias well suited to a range of algorithmic and natural language problems. By tying parameters across layers (depth), the Universal Transformer can be seen as iteratively refining its encoding of the sequence by applying a recurrent transformation in parallel over all symbols in the sequence for several steps (in depth).

The Universal Transformer has additional computationally advantageous features. For example, unlike the Transformer model, the Universal Transformer is computationally universal, meaning that the model can be used to simulate any Turing machine. In addition, number of computational steps of the Universal Transformer can be varied dynamically after training because the model shares weights across its sequential computational steps. Thus, the depth employed by the model can be scaled dynamically to the size and/or complexity of the input sequence.

In experiments on several tasks, the Universal Transformer consistently improves significantly over both a feed-forward Transformer and an LSTM (Long short-term memory) recurrent neural network.

An adaptive variant of the Universal Transformer employs an adaptive computation time mechanism per position in the sequence. When running for a fixed number of steps the Universal Transformer is equivalent to a Transformer whose parameters are tied across layers. In its adaptive form, however, the Universal Transformer can effectively interpolate between the feed-forward, fixed depth Transformer and a gated, recurrent architecture running for a number of steps dependent on the input data. In experiments, the adaptive variant achieves state of the art results on multiple language understanding tasks.

The Universal Transformer optionally applies a dynamic Adaptive Computation Time (ACT) halting mechanism at each position of the sequence. ACT mechanisms are described in Graves, Adaptive computation time for recurrent neural networks, arXiv preprint arXiv:1603.08983, 2016, available at https://arxiv.org/pdf/1603.08983.pdf.

The subject matter described in this specification can be implemented in particular embodiments so as to realize one or more of the following advantages.

A Universal Transformer system of the type described can be used to implement autoregressive sequence-to-sequence models wherever such models are used to generate outputs. Examples of applications of autoregressive models include machine translation of one natural language to another, summarization of natural language text, in which the outputs are sequences of words in sentences, speech to text, and text to speech, involving sequences of words and phonemes. Other example applications include image generation, language modeling, and parsing, e.g., constituency parsing. Other examples include applications based on sequences of images, including applications in self-driving cars and robotics control. For example, from a sequence of inputs, e.g., images, of or from a physical system, real or virtual, that includes such model, can output a sequence of actions for controlling a machine operating in or with the physical system.

The techniques can be implemented advantageously in computer systems with GPUs and other accelerator hardware to exploit the parallel computational structure of the Universal Transformer.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
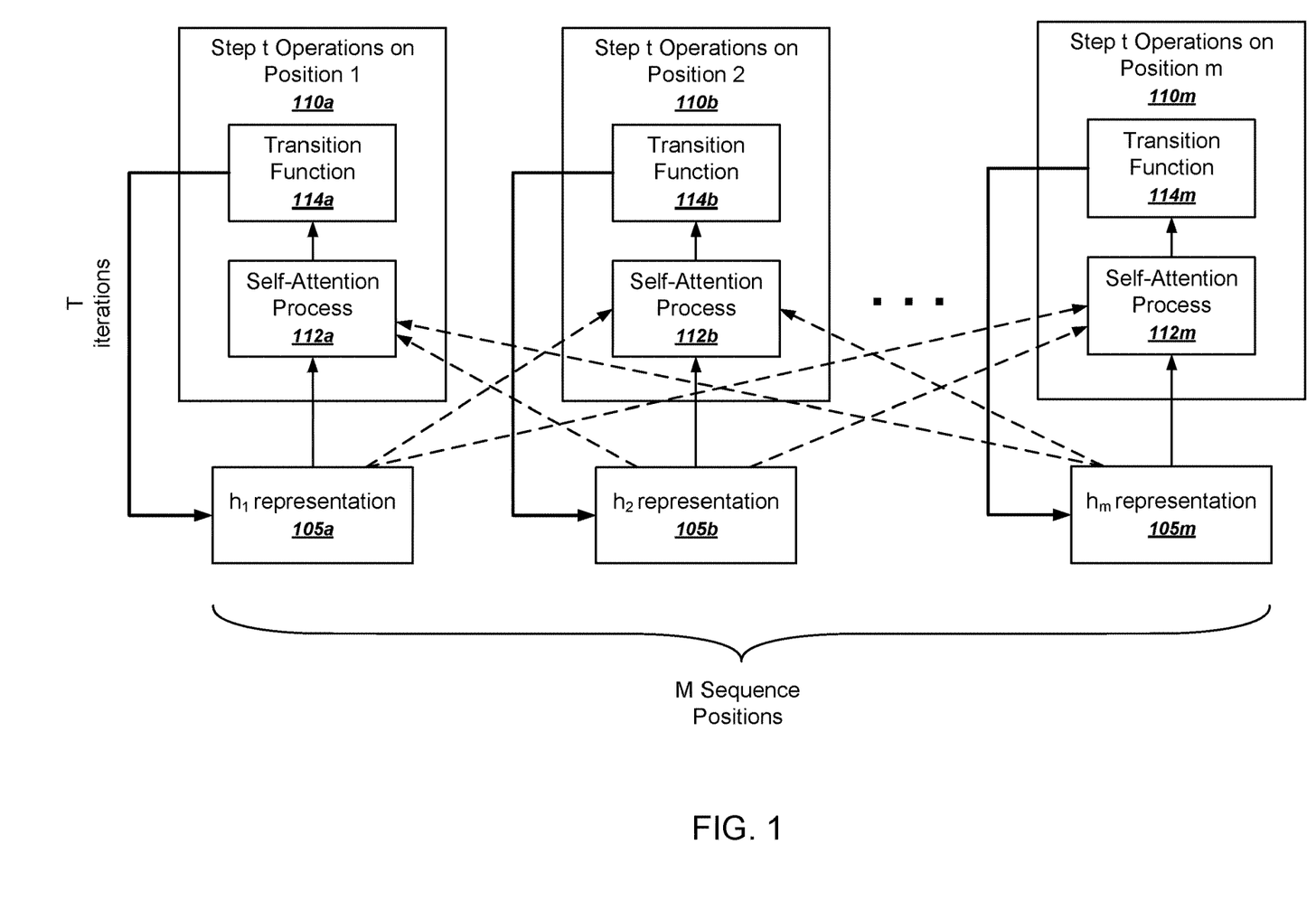
FIG. 1 is a diagram that illustrates the operations of an example Universal Transformer on a sequence.

FIG. 1 is a diagram that illustrates the operations of an example Universal Transformer on a sequence. The computational structure illustrated in FIG. 1 can be used to implement an encoder or a decoder on an encoder computer system or a decoder computer system having one or more computers in one or more locations. For simplicity, the example will be described as being implemented on a system of one or more computers. As described above, the computational structure of the Universal Transformer can be implemented on parallel processing systems, with each computational resource of a parallel processing system performing the operations of one or more positions in the sequence.

In general, to implement either an encoder or a decoder, the system can perform a same series of encoding or decoding operations over M sequence positions, possibly in parallel, for T iterations. As will be described in more detail below, in some implementations the system can adaptively devote more computing resources to some positions and less resources to other positions. In some implementations, the system uses the same parameter values across all positions and all time steps.

The operations of each time step at each position can include at least a self-attention process and a transition function. For example, at step t, the system can process the first element in the sequence, the $h_1$ representation 105a, using a self-attention process 112a and a transition function 114a. The system can then update the $h_1$ representation 105a and repeat the same steps for T iterations. Similarly, the system can process the second element in the sequence, the $h_2$ representation 105b, for T iterations using a self-attention process 112b followed by a transition function 114b and an update of the $h_2$ representation 105b. Likewise, the system can process the last element in the sequence, the $h_m$ representation 105m, for T iterations using a self-attention process 112m followed by a transition function 114m and an update of the $h_m$ representation 105m.

Although the computations for only three sequence positions are shown in FIG. 1, the sequence can have any arbitrary length. Therefore, to improve computational performance the system can implement the computations on any appropriate parallel processing hardware. For example, each of the step operations can be implemented by different streaming multiprocessors of a GPU or different processing cores of a multicore CPU. Alternatively or in addition, each of the step operations can be performed by different computers in a distributed system.

As shown in FIG. 1, the self-attention processes 112a-m for each sequence position can use as input the current representations of other sequence positions. In other words, at each step, the system can condition the output for a particular position on the representations so far generated for one or more other positions. When the operations are being performed with parallel processing, the representations can be stored in a centrally accessible location or broadcasted after each step to all processors performing the operations.

As will be described in more detail below, the self-attention process for the decoder can also include a second stage attention process that uses as input the final representations generated by the encoder.

Figure 2:
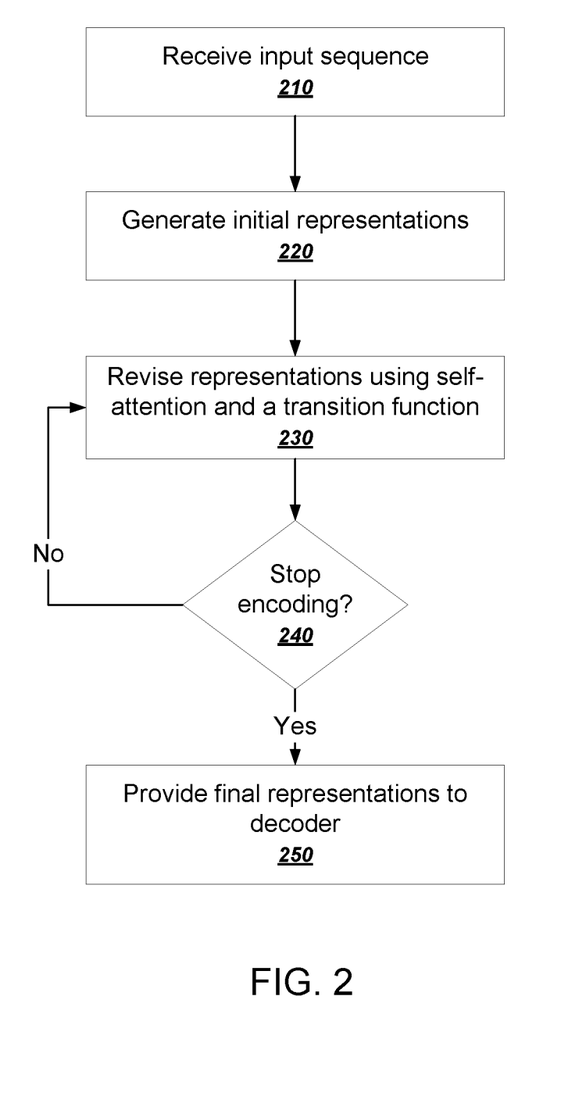
FIG. 2 is a flowchart of an example process for encoding a source sequence.

FIG. 2 is a flowchart of an example process for encoding a source sequence. The example process can be performed by an appropriately programmed system of one or more computers in one or more locations. The process will be described as being performed by a system of one or more computers.

The system receives an input sequence (210). As described above, the Universal Transformer is widely applicable to a large collection of sequence-to-sequence learning tasks. Thus, the input sequence can be any appropriate input sequence of elements in a sequence-to-sequence learning task.

Common sequence-to-sequence learning tasks include question-answering tasks, in which case the input sequence is words in a question sentence; subject-verb agreement tasks, in which case the input sequence is words a natural language sentence; predicting missing target words, in which case the input sequence is one or more preceding natural language sentences; algorithmic tasks, in which case the input sequence can be a sequence of symbols, e.g., integers; program evaluation and memorization tasks, in which case the input is symbols in a computer program; machine-translation tasks, in which case the input is words of a natural language sentence in a first language.

The system generates respective initial representations of elements in the input sequence (220). For example, the system can generate a vector representation for each element in the input sequence. Thus, if the input sequence is of length m and the representations are d-dimensional, the system can initialize a matrix $H^0 \in \mathbb{R}^{m \times d}$, with m rows, one for each item of the input sequence, with the d elements of the representation of the item in the d columns of the matrix in the row. When the input elements are words, the system can generate the input representations that are respective word embeddings of the words in which the word embeddings are vector representations of the words.

The system then repeatedly revises the representations using a self-attention process and a transition function for multiple steps. Thus, the system revises the representations (230), and determines whether a stop-encoding condition is reached for each input element (240). In some implementations, the stop-encoding condition for each input element is a minimum number of revision steps T.

However, in sequence processing systems, certain symbols, e.g., some words or phonemes, are usually more ambiguous than others. Therefore, the system can dynamically determine to allocate more processing resources to these more ambiguous symbols. For example, the system can use Adaptive Computation Time as a mechanism for dynamically modulating the number of computational steps needed to process each input element. A Universal Transformer with dynamic halting thus modulates the number of computational steps needed to process each input symbol dynamically. The number of steps can be based on a scalar pondering value that is predicted by the model at each step. The pondering values are in a sense the model's estimation of how much further computation is required for the input symbols at each processing step.

Once the per-element recurrent block halts (indicating a sufficient number of revisions for that element), its representation is simply copied to the next step until all blocks halt or until a maximum number of steps is reached.

If the stop-encoding condition has not been met, the system performs another revision step (branch to 230).

The system can apply the same series of operations iteratively on every step by recursively applying the same series of operations. In some implementations, the system also uses the same learned parameter values for each step.

For example, at each revision step t from 1 to T, the system can compute an updated representation $H^t$. To do so, the system can apply a multihead dot product self-attention mechanism followed by a recurrent transition function. In some implementations, the system also uses residual connections around each of these computations and applies dropout and layer normalization. In some implementations, the system computes the updated representation of Ht according to:

$$H^t = \text{LayerNorm}(A^{t-1} + \text{Transition}(A^t))$$

where $A^t = \text{LayerNorm}(H^{t-1}\text{MultiHeadSelfAttention}(H^{t-1} + P^t))$, where the $P^t$ terms are two-dimensional (position, time) coordinate embeddings, obtained by computing vertically and horizontally the sinusoidal position embedding vectors according to:

$$P_{pos,2i}{}^t = \sin(pos/1000^{2i/d})$$

$$P_{pos,2i+1}{}^t = \cos(pos/1000^{2i/d})$$

for the position and the time step separately (pos) for each dimension (i). The system can then sum these component-wise before applying the self-attention process.

The self-attention process can be computed as a multihead self-attention with k heads according to:

MultiHeadSelfAttention(H)=Concat(head$_1$, . . . , head$_k$)$W^O$ where head$_i$=Attention(H$W_i^Q$,H$W_i^K$,H$W_i^V$), the projections are the following learned parameter matrices:

$W^Q \in \mathbb{R}^{d \times d/k}, W^K \in \mathbb{R}^{d \times d/k}, W^V \in \mathbb{R}^{d \times d/k}$ and $W^O \in \mathbb{R}^{d \times d}$ and the attention is a scaled dot product attention computed according to:

$$\text{Attention}(Q, K, V) = \text{softmax}\left(\frac{QK^T}{\sqrt{d}}\right)V,$$

where d is the number of columns of Q, K and V and the dimension of the symbol representations.

The system can tailor the transition function to the particular task. For example, the system can use a separable convolution or a fully-connected neural network having a single rectified-linear activation function between two linear transformations, applied position-wise, e.g., individually to each row of $A^t$.

After the stop-encoding condition is reached, e.g., after T steps, the system provides final representations to the decoder (250). In some implementations, the final output is a matrix of vector representations $H^T$ for the input sequence.

Figure 3:
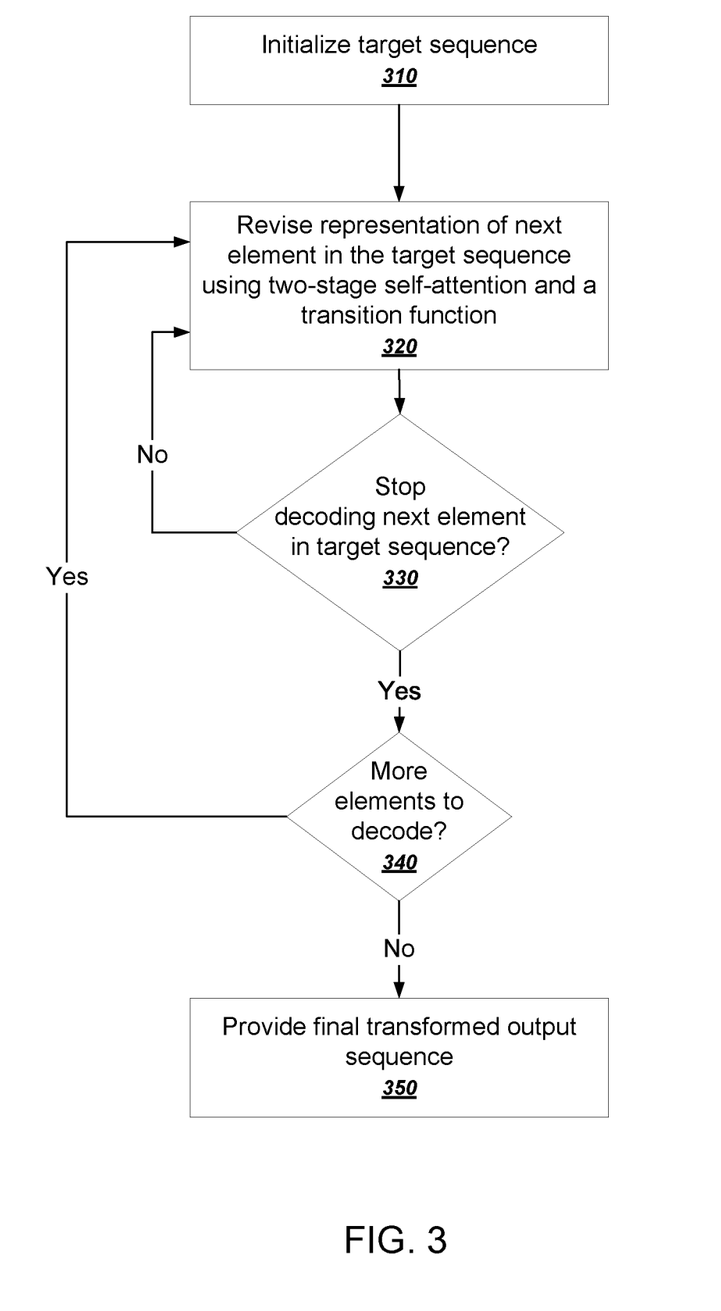
FIG. 3 is a flowchart of an example process for decoding a target sequence.

FIG. 3 is a flowchart of an example process for decoding a target sequence. As described above, the decoding process can share the same basic structure in depth as the encoder process, but performs an additional self-attention stage that uses the final encoder representations. As shown by FIGS. 2 and 3, the system can implement the Universal Transformer by running the encoder process with T steps once, followed by running the decoder process with N steps each autoregressively multiple times for each element in the target sequence. The example process can be performed by an appropriately programmed system of one or more computers in one or more locations. The process will be described as being performed by a system of one or more computers.

The system receives an initial target sequence (310). The system can generate the initial target sequence according to the task at hand. For example, tasks related to natural language processing and machine translation, the system can initialize an answer sequence. For tasks relating to algorithmic process and program evaluation, the system can initialize a sequence of symbols.

The system revises a representation of the next predicted element in the target sequence using two-stage self-attention and a transition function (320). The system can use the same structure as the encoder, with a first self-attention stage. The system can additionally apply a second self-attention stage using the final encoder representations of the input sequence using a multihead dot product attention function. In the second self-attention stage, the system can use queries Q obtained from projecting the decoder representations and keys K and values V obtained from projecting the encoder representations. The system can autoregressively determine each next symbol in the sequence, which means that each output in the target sequence is conditioned on all of the previously generated outputs in the target sequence.

The system determines whether a stop-decoding condition is met for the next element in the target sequence (330). In some implementations, the system uses a fixed number of steps N, which may or may not be equal to the number of steps T used by the encoder process.

Alternatively or in addition, the system can adaptively alter the number of steps in the decoding process for the next symbol depending on the position of the next symbol. For example, the system can apply the Adaptive Computation Time (ACT) halting mechanism at each position and copy the state to the next step after a block is halted, until all blocks are halted or the predetermined maximum number of steps have been performed.

If the stop-decoding condition is not met, the system again performs another step of revisions for the next element in the target sequence (branch to 320).

Otherwise, the system determines whether there are more elements to decode (branch to 340). In some implementations, the model is trained to generate a special end-of-sequence symbol when there are no more output elements to be decoded. Therefore, the system can continue the process until the decoder generates the end-of-sequence symbol.

If there are more elements to decode, the system begins revising a representation of the next element in the target sequence (branch to 320).

If there are no more elements to decode, the system provides a final transformed output sequence (branch to 350). To obtain the per-symbol target distributions at positions 1 through n, the system can apply an affine transformation O from the final state to an output vocabulary size, followed by the following softmax function:

$$p(y_{pos}|y_{[1:pos-1]}, H^T) = \text{softmax}(OH^T).$$

During the training process, the system can perform teacher-forced training in which the decoder input is the target output shifted to the right by one position. The system can further mask the decoder self-attention distributions so that the model can only attend to positions to the left of any predicted symbol.

Figure 4:
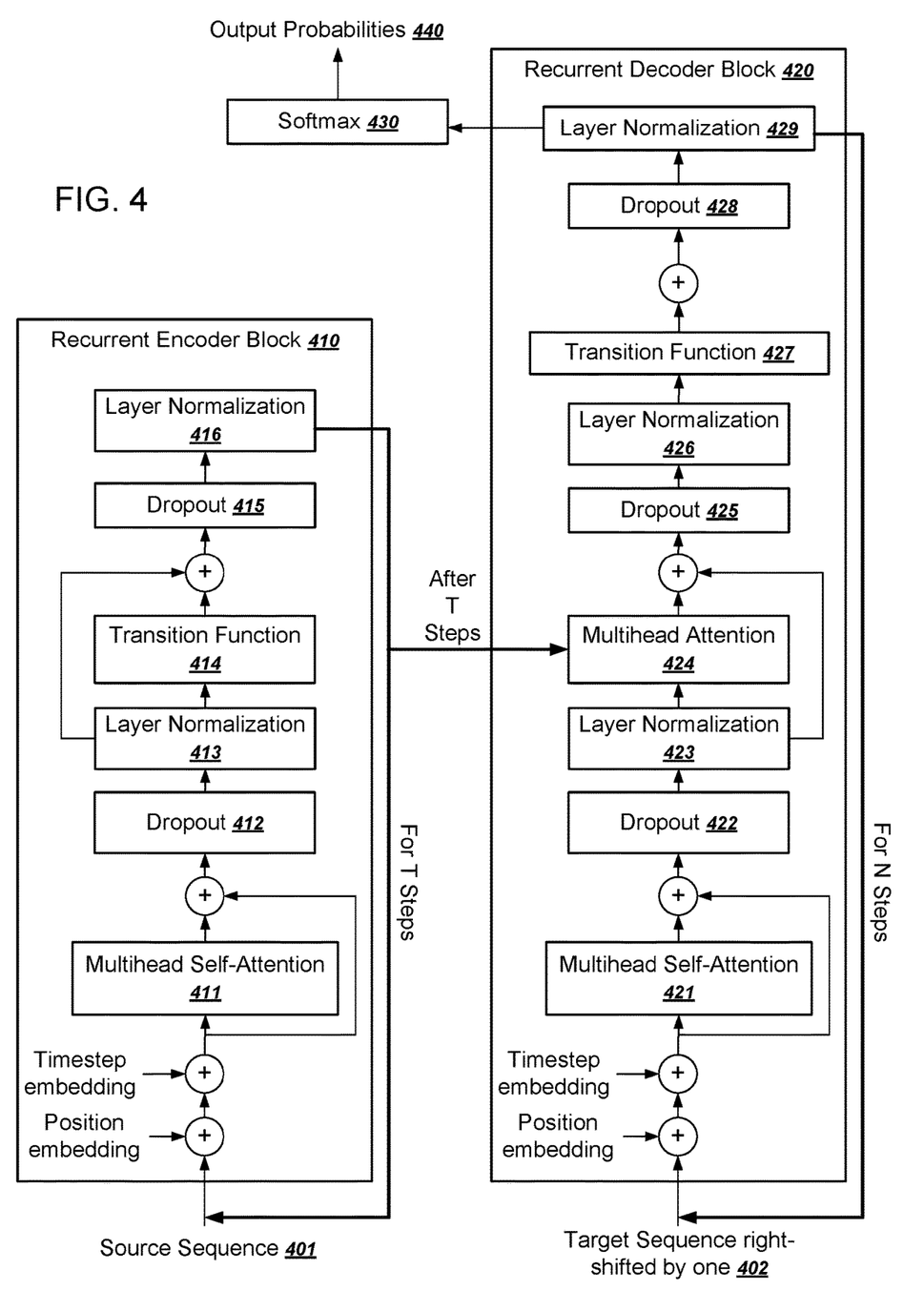
FIG. 4 illustrates an example architecture of a Universal Transformer.

FIG. 4 illustrates an example architecture of a Universal Transformer. As described above, the Universal Transformer includes a recurrent encoder block 410 and a recurrent decoder block 420. Each of these blocks can be implemented using respective computing resources, and, as described above, the blocks can have multiple instances for each element in an input sequence.

For ease of illustration the encoder block 410 is illustrated in FIG. 4 as receiving a source sequence 401. However, as described above, a system can use multiple instances of the encoder block for each element in the source sequence 401, which can be executed for T steps in parallel. Thus, the representation of the source sequence 401 in FIG. 4 can be interpreted as a matrix with each row being a different representation of a different element in the source sequence 401.

In operation, the encoder block 401 can receive the source sequence 401 and add position and timestep embeddings. The encoder block 410 can then perform a multihead self-attention process 411, followed by layers of dropout 412 and layer normalization 413. The encoder block 410 can then perform a transition function 414 followed by another layer of dropout 415 and layer normalization 416.

The encoder block then repeats these operations for T steps, each time revising the representation of each element in the source sequence 401. After T steps, the encoder block 410 provides the final representations of the elements in the source sequence 401 to the decoder block 420. As described above, the number of steps for each input element can differ. For elements whose encoding block has halted, the system can simply copy the halted representation to the next step.

For ease of illustration, the decoder block 420 is illustrated in FIG. 4 as receiving a target sequence 402. However, as described above, a system can use multiple instances of the decoder block for multiple steps for each element so far generated in the target sequence. In other words, the number of decoder blocks can grow as more elements are generated in the target sequence. The system can execute each of the decoder blocks for each of the elements in the target sequence in parallel.

In operation, the decoder block 420 can receive the target sequence 402 and add position and timestep embeddings. The decoder block 420 can then perform a multihead self-attention process 421, followed by layers of dropout 422 and layer normalization 423.

The decoder block 420 can then perform a second stage of attention, with a multihead attention process 424 conditioned on the final representations generated by the encoder block 410.

The decoder block 420 can then perform additional layers of dropout 425 and layer normalization 426 before performing a transition function 427. The decoder block 420 can perform final layers of dropout 428 and layer normalization 429.

The decoder block 420 can repeat these operations for multiple steps for each element in the target sequence. As described above, the number of steps can be dynamically selected by the model for each position to be decoded.

After the N steps of decoding have completed, the system applies a final softmax layer 430 to generate final output probabilities 440.

Figure 5:
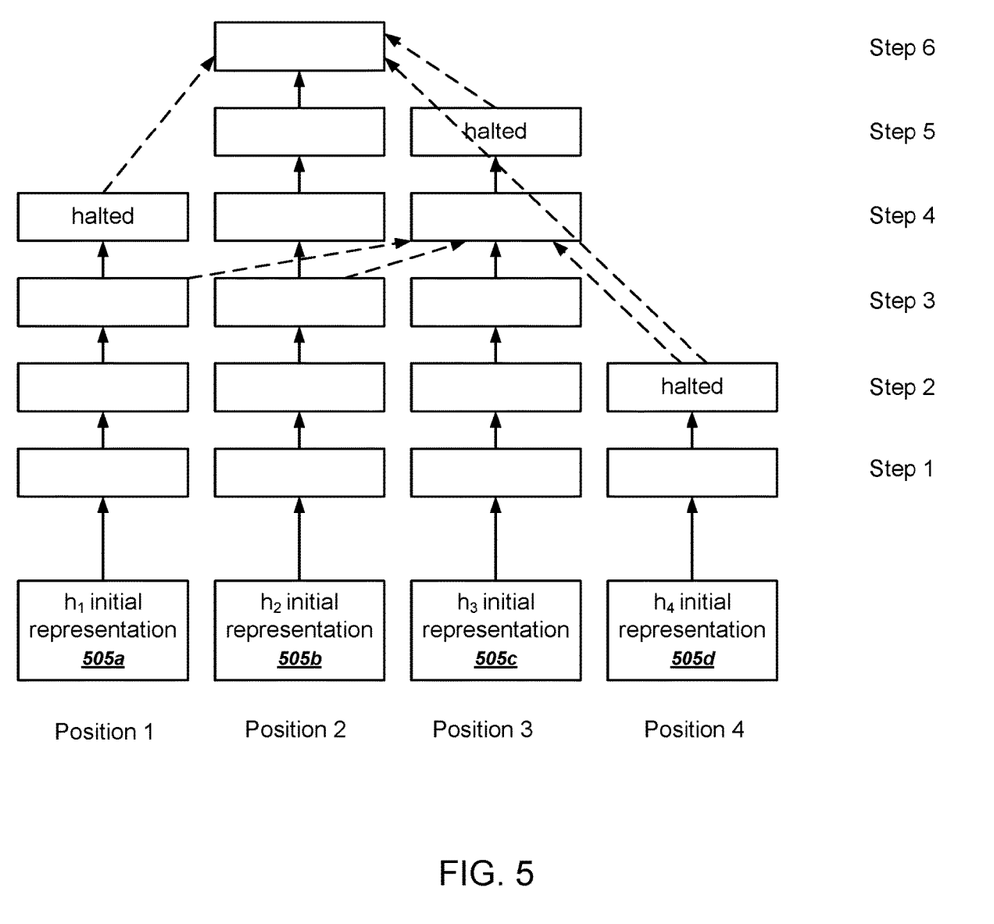
FIG. 5 illustrates dynamic selection of a number of processing steps per element in a sequence.

FIG. 5 illustrates dynamic selection of a number of processing steps per element in a sequence. As shown, the sequence has four elements, each with a respective initial representation 505a, 505b, 505c, and 505d.

At step 1, the system can generate in parallel four revised representations using respective encoder or decoder blocks for each position.

At step 2, the block for position 4 halts, while the system generates three revised representations for the other positions.

At step 3, the system generates three revised representations for the three positions that have not yet halted.

At step 4, the block for position 1 halts. The system generates two revised representations for the other positions that have not halted at position 2 and position 3.

The dashed lines in FIG. 5 represent the inputs to the self-attention process used to generate the revised representations. Thus, at step 4, the system generates the revised representation for position 3 by using the representations of the other positions as input to the self-attention process. Notably, as shown in FIG. 5 the system uses the halted representation for position 4 from step 2, while using representations from step 3 for positions 1 and 2. In other words, the system can execute the self-attention process by using representations generated in different steps at different times.

At step 5, the block for position 3 halts, and the system generates a revised representation only for position 2.

Similarly, at step 6, the system generates a revised representation for position 2 using representations generated on three different steps: the representation from step 5 for position 3, the representation from step 4 for position 1, and the representation from step 2 for position 4.

The final output of the process is then the collection of the final halted representations at each position.

As described above, systems and methods described herein may be applied to a variety of technical tasks, a few of which will now be described in more detail.

For example, for question-answering tasks the goal is to answer a question given a number of English sentences that encode potentially multiple supporting facts. The goal is to measure various forms of language understanding by requiring a certain type of reasoning over the linguistic facts presented in each story. A standard Transformer does not achieve good results on this type of task. To encode the input, the system can first encode each fact in the story by applying a learned multiplicative positional mask to each word's embedding, and summing up all embeddings. Models can either be trained on each task separately ("train single") or jointly on all tasks ("train joint"). The system can embed the question in the same way, and then feed the Universal Transformer with these embeddings of the facts and questions. Over 10 runs with different initializations and using the best model based on performance on the validation set, both the Universal Transformer and Universal Transformer with dynamic halting achieve state-of-the-art results on all tasks in terms of average error and number of failed tasks. TABLE 1 summarizes the results.

TABLE 1

| Model | 10K examples | | 1K examples | |
| --- | --- | --- | --- | --- |
| Previous Best Results | | | | |
| QRNet (Seo et al., 2016) | 0.3 (0/20) | | | |
| Sparse DNC (Rae et al., 2016) | | 2.9 (1/20) | | |
| GA + MAGE (Dhingra et al. 2017) | | | 8.7 (5/20) | |
| MemN2N (Sukhbaatar et al. 2015) | | | | 12.4 (11/20) |
| Transformer (Vaswani et al., 2017) | 15.2 (10/20) | 22.1 (12/20) | 21.8 (5/20) | 26.8 (14/20) |
| Universal Transformer Results | | | | |
| Universal Transformer | 0.23 (0/20) | 0.47 (0/20) | 5.31 (5/20) | 8.50 (8/20) |
| Universal Transformer with dynamic halting | 0.21 (0/20) | 0.29 (0/20) | 4.55 (3/20) | 7.78 (5/20) |

For subject-verb agreement tasks, the goal is to predict number-agreement between subjects and verbs in English. This task acts as a proxy for measuring the ability of a model to capture hierarchical dependency structure in natural language sentences. The system can use a language modeling training setup, i.e., a next word prediction objective, followed by calculating the ranking accuracy of the target verb at test time. The Universal Transformer was evaluated on subsets of the test data with different task difficulty, measured in terms of agreement attractors—the number of intervening nouns with the opposite number from the subject (meant to confuse the model). For example, given the sentence, "The keys to the cabinet," the objective during training is to predict the verb are (plural). At test time, the ranking accuracy of the agreement attractors is evaluated: i.e. the goal is to rank "are" higher than is in this case. The best LSTM with attention from the literature achieves 99.18% on this task, which outperforms a regular Transformer. The Universal Transformer significantly outperforms standard Transformers and achieves an average result comparable to the current state of the art (99.2%). However, the Universal Transformers (and particularly with dynamic halting) perform progressively better than all other models as the number of attractors increases. TABLE 2 summarizes the results.

TABLE 2

| Model | Number of Attractors | | | | | | |
| --- | --- | --- | --- | --- | --- | --- | --- |
| | 0 | 1 | 2 | 3 | 4 | 5 | Total |
| Previous best results (Yogatama et al., 2018) | | | | | | | |
| Best Stack-RNN | 0.994 | 0.979 | 0.965 | 0.935 | 0.916 | 0.880 | 0.992 |
| Best LSTM | 0.993 | 0.972 | 0.950 | 0.922 | 0.900 | 0.842 | 0.991 |
| Best Attention | 0.994 | 0.977 | 0.959 | 0.929 | 0.907 | 0.842 | 0.992 |
| Universal Transformer | | | | | | | |
| Universal Transformer | 0.993 | 0.971 | 0.969 | 0.940 | 0.921 | 0.892 | 0.992 |
| Universal Transformer with dynamic halting | 0.994 | 0.969 | 0.967 | 0.944 | 0.932 | 0.907 | 0.992 |

For language modeling tasks, the goal is to predict missing target words, in which case the input sequence is one or more preceding natural language sentences. The dataset was specifically designed so that humans are able to accurately predict the target word when shown the full context, but not when only shown the target sentence in which it appears. It therefore goes beyond language modeling and tests the ability of a model to incorporate broader discourse and longer term context when predicting the target word. The task was evaluated in two settings: as language modeling (the standard setup) and as reading comprehension. In the former (more challenging) case, a model was simply trained for next-word prediction on the training data, and evaluated on the target words at test time. In other words, the model was trained to predict all words, not specifically challenging target words. In the latter setting, the target sentence (minus the last word) was used as query for selecting the target word from the context sentences. In this task, the Universal Transformer achieves state-of-the-art results in both the language modeling and reading comprehension setup, outperforming both LSTMs and normal Transformers. In this experiment, the control set was constructed similar to the language modeling development and test sets, but without filtering them in any way, so achieving good results on this set shows a model's strength in standard language modeling.

For algorithmic tasks, the goal is to perform a symbol transformation from one sequence to another, e.g., Copy, Reverse, and integer Addition. In an experiment in which the model was trained with sequences of length 40 and evaluated on sequences of length 400, the system trained Universal Transformers using positions starting with randomized offsets to further encourage the model to learn position-relative transformations. The Universal Transformer outperformed both LSTM and the normal Transformer by a wide margin on all three tasks.

For learning-to-execute tasks, e.g., program evaluation and memorization, the Universal Transformer was evaluated on tasks indicating the ability of a model to learn to execute computer programs. These tasks include program evaluation tasks (program, control, and addition), and memorization tasks (copy, double, and reverse). Without using any curriculum learning strategy during training and without using target sequences at test time, the Universal Transformer achieves perfect scores in all the memorization tasks and also outperforms both LSTMs and Transformers in all program evaluation tasks by a wide margin.

For machine translation, the Universal Transformer was evaluated by training an English-German translation task. The Universal Transformer with a fully-connected recurrent transition function (instead of separable convolution) and without ACT improves by 0.9 BLEU over a Transformer and 0.5 BLEU over a Weighted Transformer with approximately the same number of parameters.

The Universal Transformer can also be adapted for use on other sequence-to-sequence tasks. One example application is speech-to-text conversion, in which case the input sequence is representations of sound waves and the output sequence is text in a particular language. Another example is text-to-speech conversion, in which case the input sequence is text, and the output sequence is representations of sound waves. Another example application is image generation. Another example application is robotic control.

For example, in some implementations, the sequence of inputs may comprise images (e.g., images comprising pixel data), for instance images of or from a physical system, and the corresponding output may include a sequence of actions for controlling a machine or robot, which may operate in or with the physical system.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. Generally, multitasking and parallel processing may be advantageous.

What is claimed is:

1. A method performed by one or more computers, the method comprising:
   receiving an input sequence of elements to be transformed into an output sequence of elements according to a learned transformation, each element of the input sequence having a respective initial input representation;

performing an encoding process including repeatedly revising the input representations in parallel using a same series of encoding operations for each of multiple time steps;

initializing a target sequence of elements each having a respective initial target representation;

performing a decoding process including repeatedly revising the target representations in parallel using two-stage self-attention, wherein a second stage of the two-stage self-attention uses an output generated by the encoding process after repeatedly revising the input representations; and generating, from a final version of the revised target representations, the output sequence of elements representing the learned transformation of the input sequence of elements.

2. The method of claim 1, wherein performing the decoding process comprises revising the target representations including conditioning on previous representations generated by the decoding process and on the output generated by the encoding process.

3. The method of claim 1, wherein encoding process uses only one stage of self-attention.

4. The method of claim 1, wherein the encoding process uses a transition function comprising a fully-connected neural network layer having a single rectified-linear activation function between two linear transformations.

5. The method of claim 1, wherein the encoding process uses a transition function that is a separable convolution.

6. The method of claim 1, wherein the encoding process and the decoding process both use neural networks that are recurrent in depth.

7. The method of claim 1, wherein the input sequence of elements represents a question and the target sequence of elements represents an answer to the question.

8. The method of claim 1, wherein the input sequence of elements represents a subject of a sentence and the target sequence represents a predicted verb form for the subject of the sentence.

9. The method of claim 1, wherein the input sequence of elements represents words in a sentence and the target sequence represents a predicted next word in the sentence.

10. The method of claim 1, wherein the transformation is a symbol transformation for an algorithmic task.

11. The method of claim 1, wherein the input sequence represents words in a first language and the target sequence represents a translated version of the input sequence in a second language.

12. A system comprising:
one or more computers and one or more storage devices storing instructions that are operable, when executed by the one or more computers, to cause the one or more computers to perform operations comprising:
receiving an input sequence of elements to be transformed into an output sequence of elements according to a learned transformation, each element of the input sequence having a respective initial input representation;
performing an encoding process including repeatedly revising the input representations in parallel using a same series of encoding operations for each of multiple time steps;

initializing a target sequence of elements each having a respective initial target representation;

performing a decoding process including repeatedly revising the target representations in parallel using two-stage self-attention, wherein a second stage of the two-stage self-attention uses an output generated by the encoding process after repeatedly revising the input representations; and generating, from a final version of the revised target representations, the output sequence of elements representing the learned transformation of the input sequence of elements.

13. The system of claim 12, wherein performing the decoding process comprises revising the target representations including conditioning on previous representations generated by the decoding process and on the output generated by the encoding process.

14. The system of claim 12, wherein encoding process uses only one stage of self-attention.

15. The system of claim 12, wherein the encoding process uses a transition function comprising a fully-connected neural network layer having a single rectified-linear activation function between two linear transformations.

16. The system of claim 12, wherein the encoding process uses a transition function that is a separable convolution.

17. The system of claim 12, wherein the encoding process and the decoding process both use neural networks that are recurrent in depth.

18. The system of claim 12, wherein the input sequence of elements represents a question and the target sequence of elements represents an answer to the question.

19. The system of claim 12, wherein the input sequence of elements represents a subject of a sentence and the target sequence represents a predicted verb form for the subject of the sentence.

20. One or more non-transitory computer storage media encoded with computer program instructions that when executed by one or more computers cause the one or more computers to perform operations comprising:
receiving an input sequence of elements to be transformed into an output sequence of elements according to a learned transformation, each element of the input sequence having a respective initial input representation;

performing an encoding process including repeatedly revising the input representations in parallel using a same series of encoding operations for each of multiple time steps;

initializing a target sequence of elements each having a respective initial target representation;

performing a decoding process including repeatedly revising the target representations in parallel using two-stage self-attention, wherein a second stage of the two-stage self-attention uses an output generated by the encoding process after repeatedly revising the input representations; and generating, from a final version of the revised target representations, the output sequence of elements representing the learned transformation of the input sequence of elements.

* * * * *